US011910886B2

(12) United States Patent
Scolaro

(10) Patent No.: US 11,910,886 B2
(45) Date of Patent: Feb. 27, 2024

(54) PROCESS FOR MANUFACTURING A MULTI-LAYERED SOLE DIRECTLY ON THE UPPER AND MACHINE OPERATING WITH SAID PROCESS

(71) Applicant: Filippo Scolaro, Vicenza (IT)

(72) Inventor: Filippo Scolaro, Vicenza (IT)

( * ) Notice: Subject to any disclaimer, the term of this patent is extended or adjusted under 35 U.S.C. 154(b) by 1188 days.

(21) Appl. No.: 16/497,184

(22) PCT Filed: Mar. 5, 2018

(86) PCT No.: PCT/EP2018/055269
§ 371 (c)(1),
(2) Date: Sep. 24, 2019

(87) PCT Pub. No.: WO2018/177684
PCT Pub. Date: Oct. 4, 2018

(65) Prior Publication Data
US 2021/0120919 A1  Apr. 29, 2021

(30) Foreign Application Priority Data
Mar. 27, 2017  (IT) .......................... 102017000033305

(51) Int. Cl.
*B29D 35/04* (2010.01)
*A43D 86/00* (2006.01)
(Continued)

(52) U.S. Cl.
CPC ............. *A43D 86/00* (2013.01); *B29D 35/04* (2013.01); *B29D 35/082* (2013.01);
(Continued)

(58) Field of Classification Search
CPC .... B29D 35/04; B29D 35/082; B29D 35/084; B29D 35/142
(Continued)

(56) References Cited

FOREIGN PATENT DOCUMENTS

| DE | 3731518 | 3/1988 |
|---|---|---|
| EP | 0400492 | 12/1990 |

(Continued)

*Primary Examiner* — Jeffrey M Wollschlager
*Assistant Examiner* — Xue H Liu
(74) *Attorney, Agent, or Firm* — DUANE MORRIS LLP; Gregory M. Lefkowitz

(57) ABSTRACT

A process for manufacturing a multi-layered sole directly on the upper, of the type that employs the technique known as "direct injection on the upper", by which soles are made of a plastic material and consist of a plurality of layers with different colour, density, softness and physical-mechanical properties. Said layers form at least an external sole, called "outsole", an internal sole, called "insole" that adheres and extends only partially or totally on the surface of the upper, and an intermediate sole, called "midsole", that is intended to hold the other two above-said soles. Said process provides for the use of a single mould which is brought, when suitably equipped, in a well-defined sequence, in front of at least three distinct injectors ($I_1$, $I_2$, $I_3$) in order to obtain, also in sequence, by at least a first moulding operation ($P_1$) the lower portion of the sole, i.e. the "outsole", by at least a second moulding operation ($P_2$) the upper part of the sole, i.e. the "insole" and by at least a third moulding operation ($P_3$) the "midsole".

5 Claims, 5 Drawing Sheets

(51) Int. Cl.
*B29D 35/08* (2010.01)
*B29D 35/14* (2010.01)

(52) U.S. Cl.
CPC ......... *B29D 35/084* (2013.01); *B29D 35/142* (2013.01); *A43D 2200/20* (2013.01)

(58) Field of Classification Search
USPC ....................................................... 264/255
See application file for complete search history.

(56) References Cited

FOREIGN PATENT DOCUMENTS

| | | |
|---|---|---|
| EP | 0407688 | 1/1991 |
| FR | 2671462 | 7/1992 |
| FR | 2677299 | 12/1992 |
| GB | 1435837 | 5/1976 |
| GB | 2255308 | 11/1992 |
| IT | PD910191 | 4/1993 |

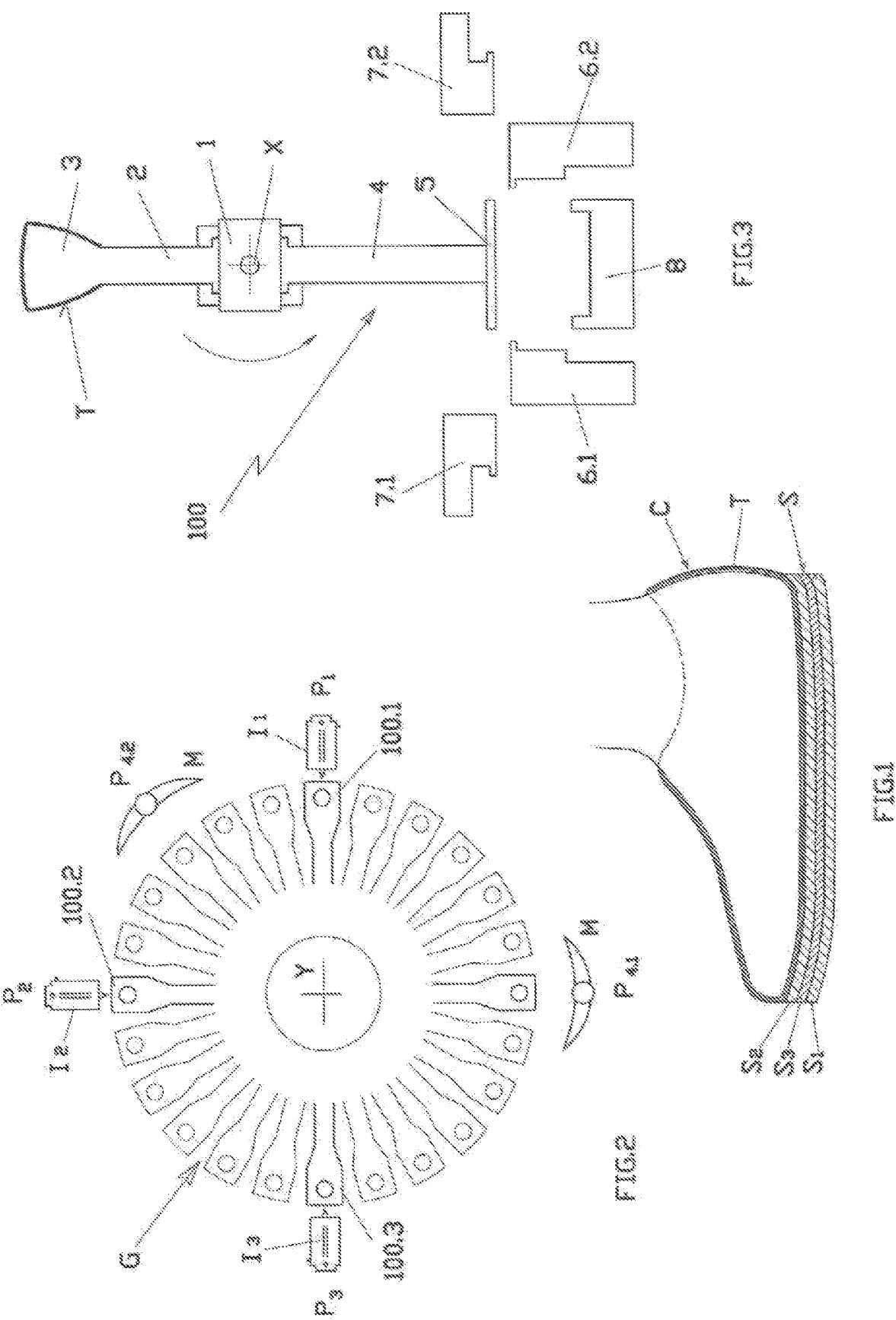

PROCESS FOR MANUFACTURING A MULTI-LAYERED SOLE DIRECTLY ON THE UPPER AND MACHINE OPERATING WITH SAID PROCESS

CROSS-REFERENCE TO RELATED APPLICATIONS

This application is a § 371 national stage entry of International Application No. PCT/EP2018/055269, filed Mar. 5, 2018, which claims priority of Italian National Application No. 102017000033305, filed Mar. 27, 2017, the entire contents of which are incorporated herein by reference.

The present invention relates to a process for manufacturing a multi-layered sole directly on the upper, according to the general part of claim 1; the invention also relates to a machine operating according to such a process.

As is well known in recent years in all sectors of the footwear market (civil, sports, professional accident prevention), the demand for footwear with particular aesthetic and/or functional characteristics has increased.

This demand has been satisfied in particular with the production of footwear, in which the upper is associated with a sole, in which the midsole and the outsole are made of plastic materials of different colours (aesthetic effect for civil and sporting use) and/or with different mechanical-physical properties (accident prevention effect, for professional use).

In practice, soles made of plastic material are used, composed of at least three layers which differ in color, density and softness and which constitute, respectively, an intermediate sole, which constitutes the "midsole", an outermost sole, which constitutes the "outsole" and an innermost sole, adhering to the upper, which constitutes the "insole" and which extends and adheres only in part or to the entire contact surface on the aforementioned upper.

The most common technique for manufacturing plastic soles with parts or layers of different colours and/or different materials is known as "direct injection on the upper".

A first process for manufacturing soles by "direct injection on the upper" provides that only two soles, the "insole" and the "midsole", are directly injected on the upper, while the "outsole" is made separately and only subsequently is made to adhere to the intermediate sole (for example, we may cite the patent document EP 0 400 492 A2—FIG. 4, ref. 9, 24)

A second method is also known, described in the patent document PD91A000191, in which the three different soles are made in a single machine and form the sole adhering to the upper.

Operationally, in order to perform this process, a plurality of pairs of first and second stations (FIG. 1, ref. 1a, 1b) are used, in which both stations of each pair are temporarily associated to a first injector (FIG. 1, ref. 14), for sequentially moulding, respectively, a first and a second part of the sole (FIG. 6B, ref. S1, S2) and in which one of the aforesaid parts of the sole is transferred from the respective moulding station to the other station of the pair (FIG. 9B, ref. 25, S1), to then mould in the latter, through a second injector (FIG. 1, ref. 15), a third part of the sole (FIG. 10B, ref. S3), which combines the aforementioned parts with each other and with the upper.

In practice, with this method the whole operation is scarcely productive and overall considerably expensive, due to the fact that it must employ pairs of stations (ref. 1a, 1b) which are temporarily associated sequentially with a first and a second injector (ref. 14, 15), the two stations being made up of differently shaped moulds and, above all, for the need of having to occupy an operator for the manual transfer of the sole from one station to the other.

The most important document of the prior art is FR 2671462 A1. This document describes a process for the manufacture of a multi-layered sole directly on the upper (the references apply precisely to this document) (FIG. 2), of the type which uses the technique known by the term "direct injection on the upper", with which soles in plastic material are made (description, page 1, lines 1-3), consisting of a plurality of layers that differ in color, density, softness and mechanical-physical properties, said layers constituting at least an outermost sole, called "outsole" (N, N1), a innermost sole, called "insole" (L) which adheres and extends only partially or totally on the upper surface (F1), and an intermediate sole, called "midsole" (M), which has the function of retaining the two other above soles, said method providing for the use of a single mould (FIG. 2) which, suitably equipped, is brought into a well-defined sequence in front of at least three distinct injectors (3, 4, 5; 6; 8) in order to obtain, also in sequence, by at least a first moulding operation (first injection, description, page 6, lines 6-8) the lower portion of the sole, or "outsole" (N, N1), by at least a second moulding operation (second injection, description, page 6, lines 31-34) the upper part of the sole, or the "insole" (L) and by at least one third moulding operation (third injection, description, page 7, lines 12-13) the "midsole" (M).

Further documents of the prior art are: GB 2255308 A, DE 3731518 A1, FR 2677299 A1, GB 1435837 A and EP 0407688 A2.

The object of the present invention is to improve and make this process more productive, so as to increase the technique of "direct injection on the upper", obviating the drawbacks of the known similar processes and machines.

Specifically, the object of the invention is to provide a method for making plastic soles with parts of different colors and/or different types of material by means of the "direct injection on the upper" technique which is more productive (hourly quantity of shoes produced) and a machine that is constructively simple and operates almost completely automatically, so that the presence of operators during operation is reduced to a minimum.

This object is achieved by a method according to the characterizing part of claim 1; further features of the process according to the invention are provided in the dependent claims.

The invention will be better defined by the description of a possible embodiment thereof, given only by way of non-limiting example, in which:

FIGS. 1, 2, 3 show views of an upper provided with the multi-layer sole, the carousel with the three moulding stations and the exploded components of the mould, respectively;

Figure 4:
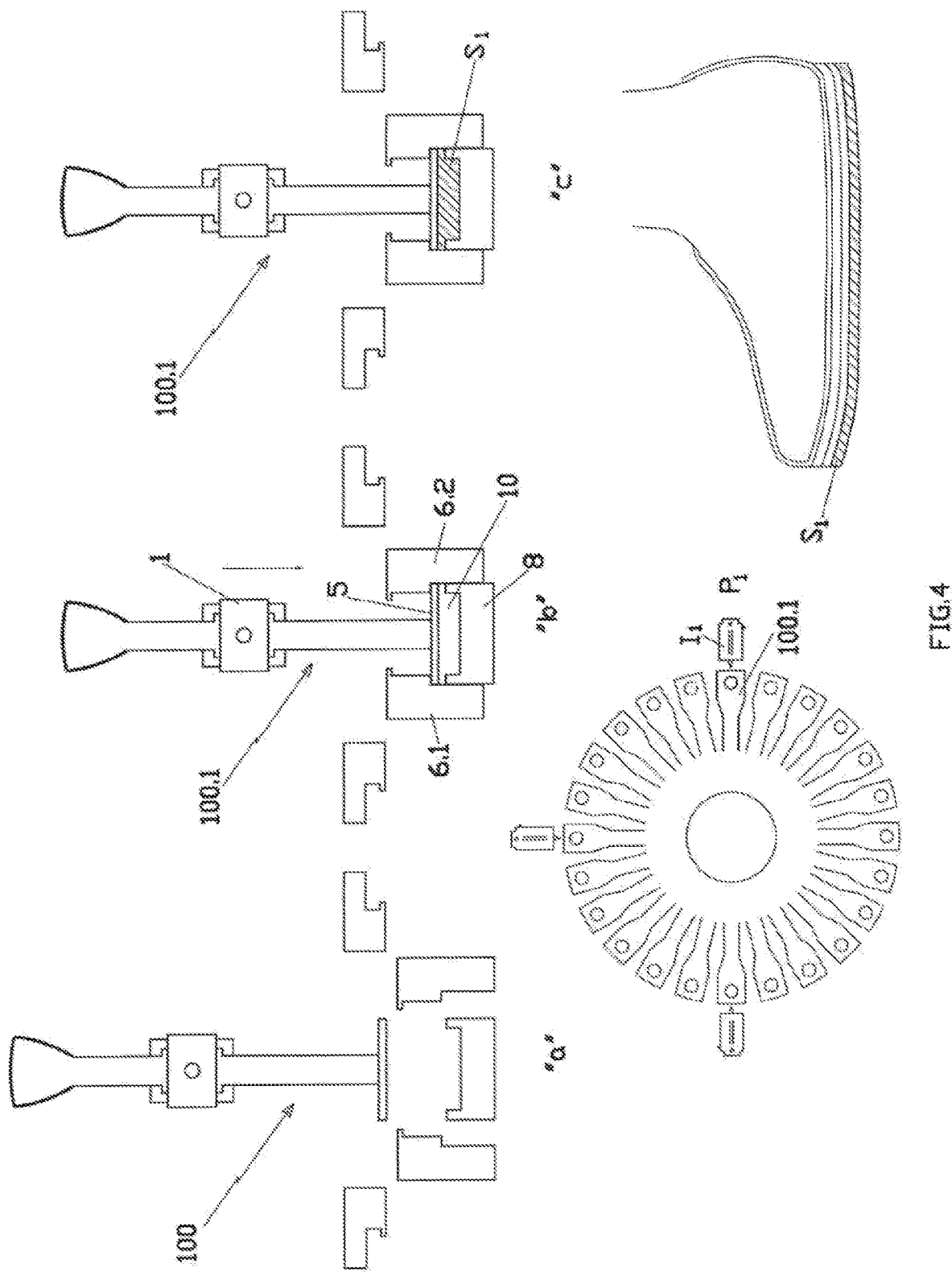
FIG. 4 shows views for the manufacture of the outsole.

As shown in FIG. 1, the shoe indicated with reference "C" comprises a upper "T" provided with a sole "S" made of plastic material, obtainable with the method according to the invention, which consists of three layers or "soles", of different color and/or different mechanical-physical properties, the outermost sole "$S_1$" constitutes the "outsole", the innermost sole "S₂" constitutes the "insole" that adheres and extends only partially or totally on the surface of the upper "T" and the intermediate sole "S₃" which constitutes the "midsole", which has the function of retaining the two other aforementioned soles.

As shown in FIG. 2, the sole "S" is made with a machine, where the moulds 100 are mounted on a carousel "G" rotating around the vertical axis "Y", where there are three moulding stations, indicated with references "P₁, P₂, P₃", in each of which there is a mould 100.1, 100.2 and 100.3 which, after being suitably equipped, is arranged sequentially in front of the respective injectors, indicated by references "I₁, I₂, I₃", to carry out the moulding, in progression, respectively, in the station "P₁" of the outsole "S₁", in the station "P₂" of the insole "S₂" and in the station "P₃" of the intermediate sole "S₃".

On the carousel there is also a station, indicated with reference "P₄", where the operator takes the completed "C" shoe from the mould and fits a new upper "T" on the form.

As shown in FIG. 3, the mould 100 consists of a series of components 100.1, 100.2 and 100.3 removably connected to each other so as to be suitably equipped in relation to the type of corresponding injector I₁, I₂, I₃, as better specified in the following description.

Specifically, the mould 100 comprises a support 1, rotating around the axis "X" of its central pin, on which a radial arm 2, ending with a form 3 related to the upper "T", and an opposite radial arm 4, ending with the disc 5, are removably hooked; two opposed side half-rings 6.1 and 6.2, two upper opposed half-rings 7.1 and 7.2 and a base 8.

The process according to the invention is implemented with the machine according to the invention as follows.

As can be seen in FIG. 4, at the first moulding station "P₁", where the "outsole" "S₁" is made, once the mould 100.1 is placed in front of the injector "I₁", from the open mould condition (ref. 4a), the support with the disc thereof is lowered, the base 8 is lifted and the two opposed side half-rings 6.1 and 6.2 are closed, so as to create a cavity 10 (ref. 4b) inside which the plastic material is injected, through the injector "I1" or by direct casting or by other techniques, so as to form the "outsole" "S₁" (ref. 4c).

Figure 5:
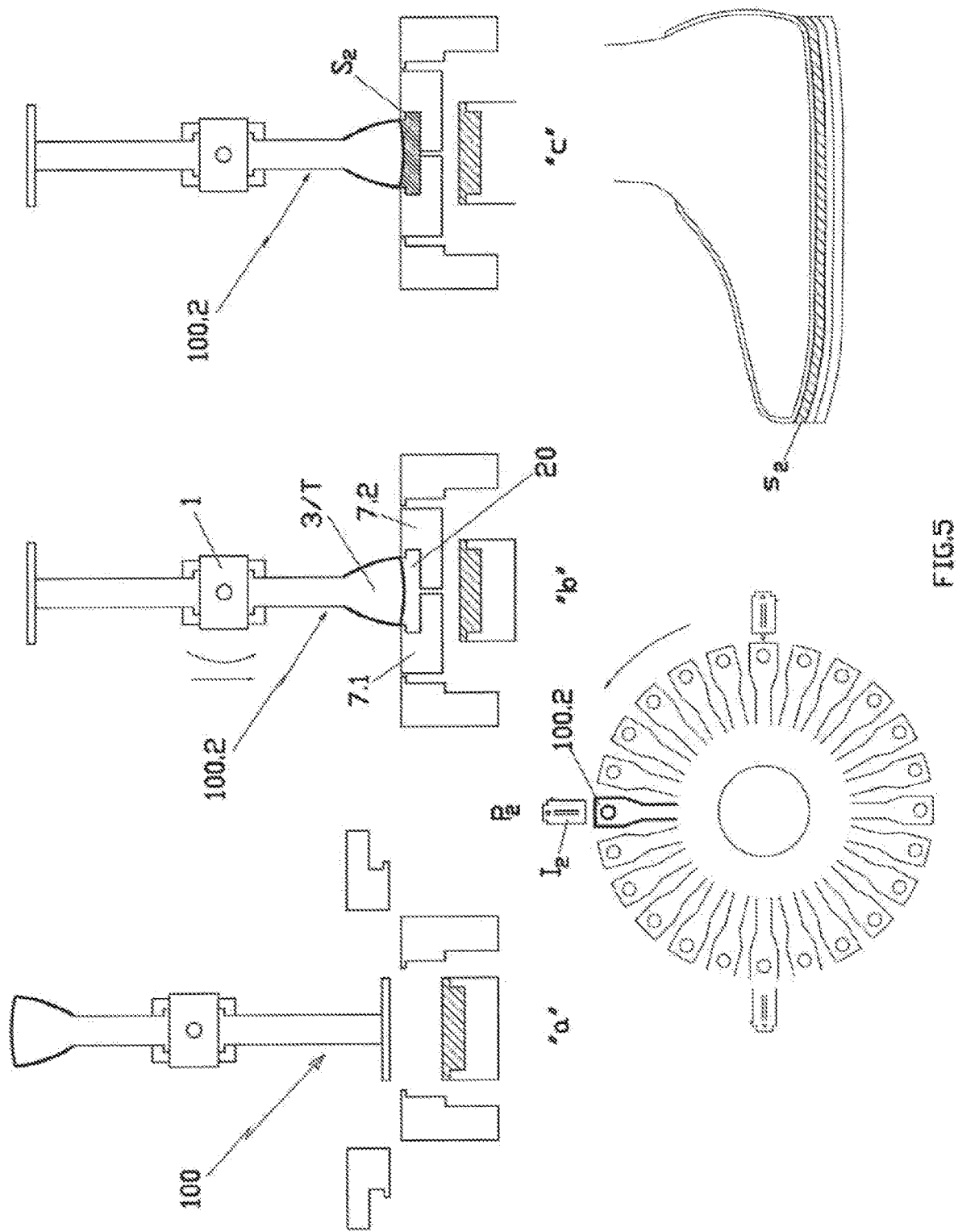
FIG. 5 shows views relating to the manufacture of the insole.

As can be seen in FIG. 5, at the second moulding station "P₂", where the "insole" "S₂" is made, by the rotation of the carousel "G" the mould 100.2 is placed in front of the injector "I₂" and, from the open mould condition (ref. 5a), the support 1 is lowered and rotated by 180°, so as to place the form 3 related to the upper "T" in a lower position and the two opposed upper half-rings 7.1 and 7.2 are closed so as to create a cavity 20 (ref. 5b) inside which the plastic material is injected, through the injector "I₂" so as to form the "insole" "S₂" (ref. 5c).

Figure 6:
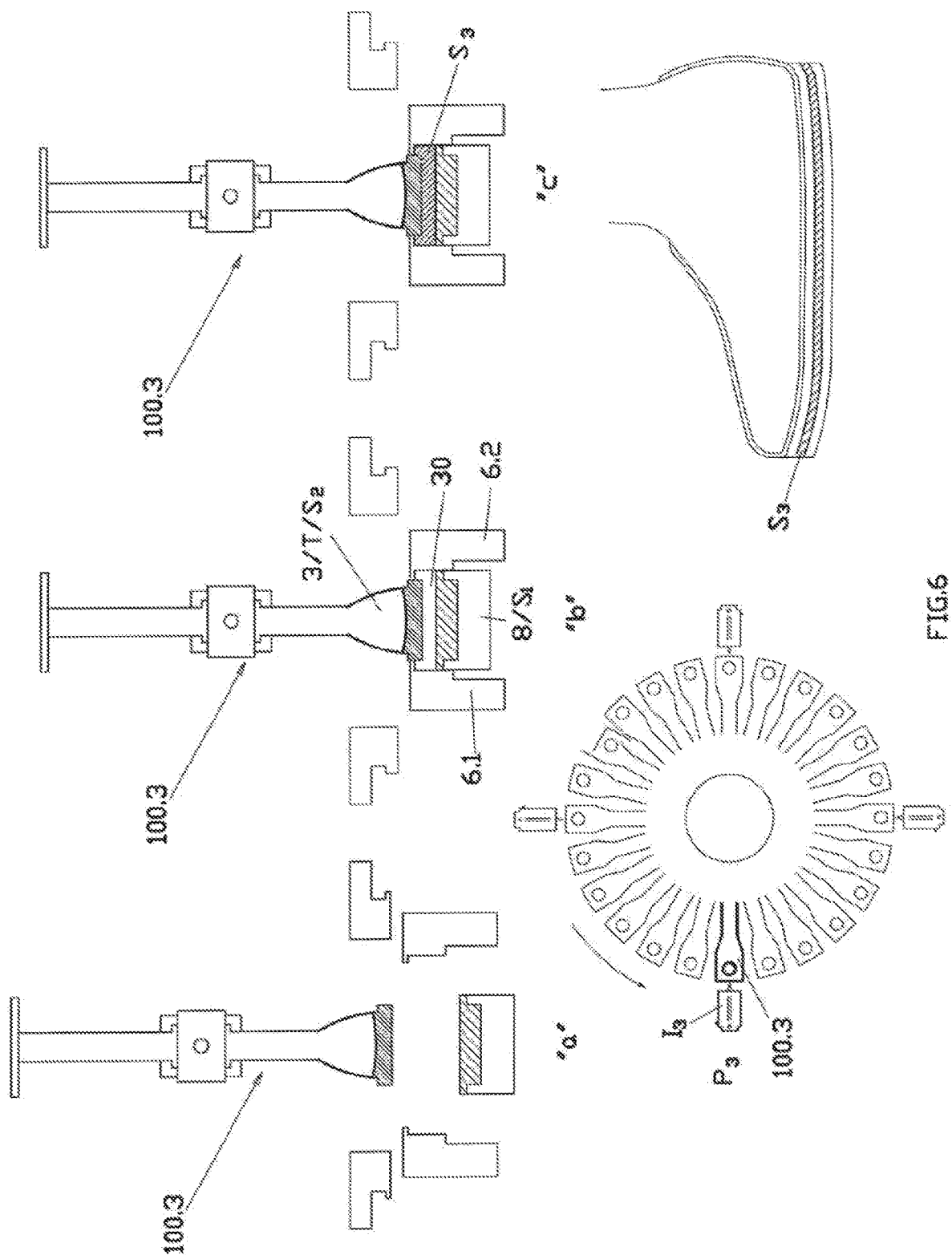
FIG. 6 shows views relating to the manufacture of the midsole.

As can be seen in FIG. 6, at the third moulding station "P₃", where the "midsole" "S₃" is made, by the rotation of the carousel "G" the mould 100.3 is placed in front of the injector "I₃" and, from the open mould condition (ref. 6a), the support 1 and the form thereof 3 related to the upper "T" and the "insole" "S₂" are lowered, the base 8 related to the "outsole" "S₁" is lifted and the two opposed side half-rings 6.1 and 6.2 are closed, so as to create a cavity 30 (ref. 6b) inside which the plastic material is injected through the injector "I₃", so as to form the "midsole" "S₃", in order to complete the sole "S" (ref. 6c).

Figure 7:
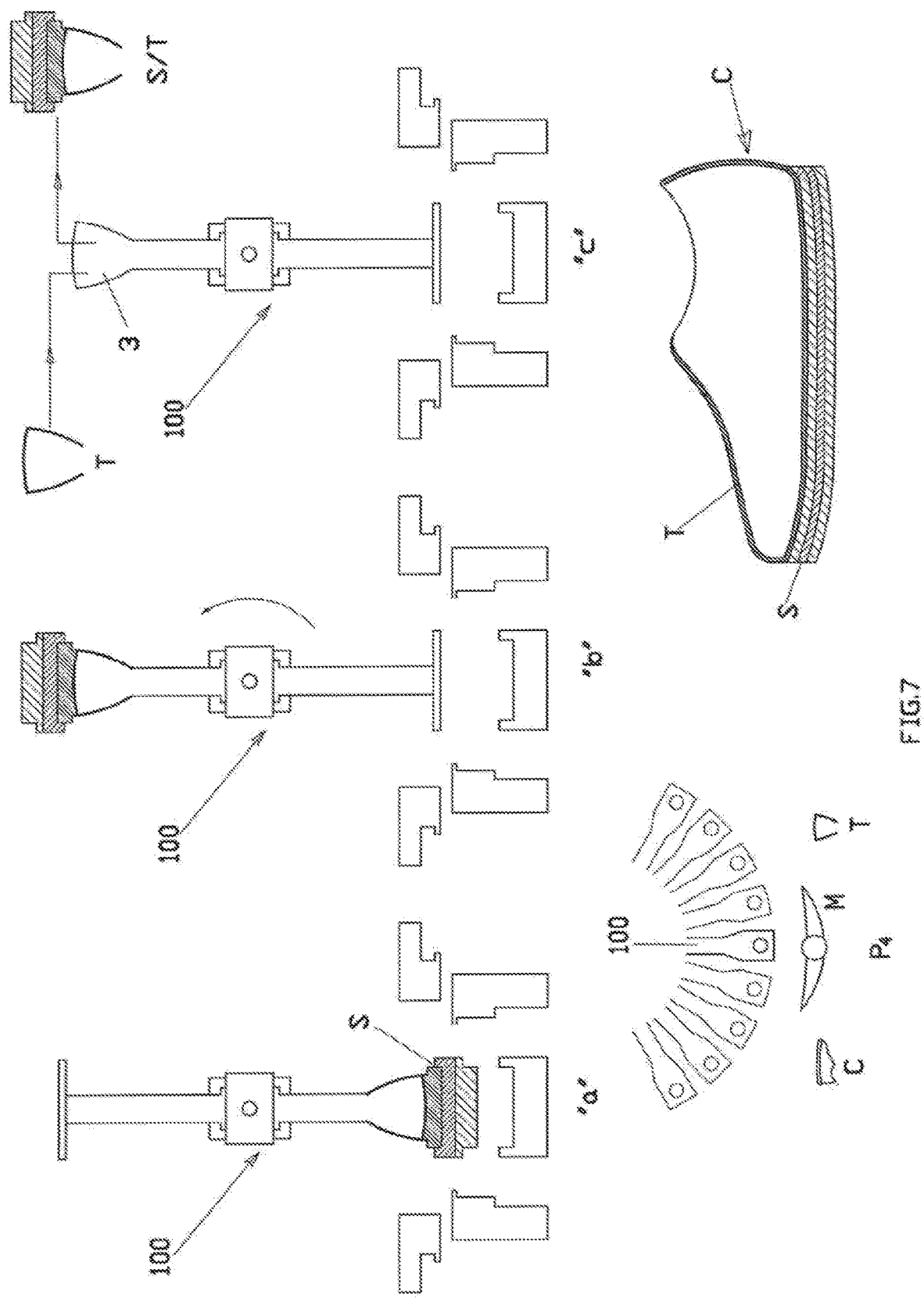
FIG. 7 shows views relating to the unloading of the complete shoe and the loading of a new upper.

Finally, as can be seen in FIG. 7, a fourth station "P₄" is provided where, after hardening the injected plastic material, by the further rotation of the carousel "G", the mould 100 is brought in front of an operator "M"; from the open mould condition (pos. 7a), the support 1 is rotated by 180° so as to bring the upper "T" provided with the sole "S" (ref. 7b) upwards, so that it is easily accessible for the above-said operator "M", who removes the footwear "C" from the form 3 and puts a new upper "T" on the above-said form 3.

In particular, as shown in FIG. 2, depending on the size of the carousel "G", which depends on the number of mounted moulds 100, the aforementioned station can be positioned upstream (ref. P₄.₁) or downstream (pos. P₄.₂) of the first station "P₁".

From the foregoing it is clear that the intended objects of rapidity in terms of execution of the process and of the cost-effectiveness in the manufacture and use of the machine have been fully achieved.

Of course, the technical design details and the components used, known in the prior art and in evolution, may be the most varied, provided that everything falls within the inventive concept defined by the following claims.

The invention claimed is:

1. A process for manufacturing a multi-layered sole directly on an upper employing a technique known as "direct injection on the upper", by which soles (S) are made of a plastic material and consist of a plurality of layers with different colour, density, softness, said layers forming at least an external sole, called "outsole" (S₁), an internal sole, called "insole" (S₂) that adheres and extends only partially or totally on a surface of the upper (T), and an intermediate sole, called "midsole" (S₃), that is intended to hold the other two above-said soles (S₁, S₂), said process providing for use of a single mould which is brought, when suitably equipped, in a well-defined sequence, in front of at least three distinct injectors (I₁, I₂, I₃) in order to obtain, also in sequence, by at least a first moulding operation (P₁) a lower portion of the sole, i.e. the "outsole" (S₁), by at least a second moulding operation (P₂) a upper part of the sole, i.e. the "insole" (S₂) and by at least a third moulding operation (P₃) the "midsole" (S₃), wherein, said process
employs the single mould consisting of a number of components removably connected to each other in order to be able to be suitably equipped with respect to the injector of the at least three distinct injectors (I₁, I₂, I₃), which components comprise a support, rotating about an axis (X) of its central pin on which a radial arm, ending with a form related to the upper (T), and an opposite radial arm, ending with a disc, are removably hooked, two opposed side half-rings, two upper opposed half-rings and a base.

2. The process for manufacturing a multi-layered sole directly on the upper according to claim 1, wherein it provides a cavity in the mould, in order to obtain the "outsole" (S₁), that is defined by the disc, the base and the two opposed side half-rings, mutually close to each other.

3. The process for manufacturing a multi-layered sole directly on the upper according to claim 1, wherein it provides a cavity in the mould, in order to obtain the "insole" (S₂), that is defined by a form related to the upper (T) and by the two opposed upper half-rings, mutually close to each other.

4. The process for manufacturing a multi-layered sole directly on the upper according to claim 1, wherein it provides a cavity in the mould, in order to obtain the intermediate sole (S₃), that is defined by the form related to the upper (T) and the "insole" (S₂), by the base related to the "outsole" (S₁) and by the two opposed side half-rings, mutually close to each other.

5. The process for manufacturing a multi-layered sole directly on the upper according to claim 1, that uses a machine equipped with a plurality of moulds, mounted on a carousel (G), that rotates about a vertical axis (Y) and where there are three moulding stations ($P_1$, $P_2$, $P_3$), in each of which there is one of the single moulds that is sequentially arranged, once suitably equipped, in front of injectors ($I_1$, $I_2$, $I_3$), to progressively carry out the moulding, at the station ($P_1$) of the "outsole" ($S_1$), at the station ($P_2$) of the "insole" ($S_2$) and at the station ($P_3$) of the "midsole" ($S_3$), respectively, wherein said process provides the following steps:

- at the first moulding station ($P_1$), where the "outsole" ($S_1$) is made, once the mould is placed in front of the injector ($I_1$), from an open mould condition, the support with the disc thereof is lowered, the base is lifted and the two opposed side half-rings are closed, so as to create a cavity inside which the plastic material is injected, through the injector ($I_1$) or by direct casting so as to form the "outsole" ($S_1$);
- at the second moulding station ($P_2$), where the "insole" ($S_2$) is made, by the rotation of the carousel (G) the mould is placed in front of the injector ($I_2$) and, from the open mould condition, the support is lowered and rotated by 180°, so as to place the form related to the upper (T) in a lower position and the two opposed upper half-rings are closed so as to create a cavity inside which the plastic material is injected, through the injector ($I_2$) so as to form the "insole" ($S_2$);
- at the third moulding station ($P_3$), where the "midsole" ($S_3$) is made, by the rotation of the carousel (G) the mould is placed in front of the injector ($I_3$) and, from the open mould condition, the support and the form thereof related to the upper (T) and the "insole" ($S_2$) are lowered, the base related to the "outsole" ($S_1$) is lifted and the two opposed side half-rings are closed, so as to create a cavity inside which the plastic material is injected through the injector ($I_3$), so as to form the "midsole" ($S_3$), in order to complete the sole (S);
- after hardening the injected plastic material, by the further rotation of the carousel (G), the mould is brought in front of an operator (M) and from the open mould condition the support is rotated by 180° so as to bring the upper (T) provided with the sole (S) upwards, so that it is easily accessible for the above-said operator (M), who removes a completed footwear (C) from the form and puts a new upper (T) on the above-said form.

* * * * *